No. 833,102. PATENTED OCT. 9, 1906.
F. J. WINANS.
METHOD OF MAKING CHOCOLATE CREAMS AND THE LIKE.
APPLICATION FILED JAN. 3, 1905.
2 SHEETS—SHEET 1.
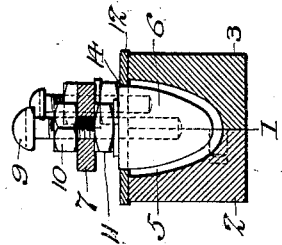
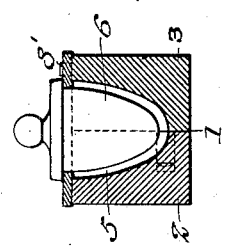
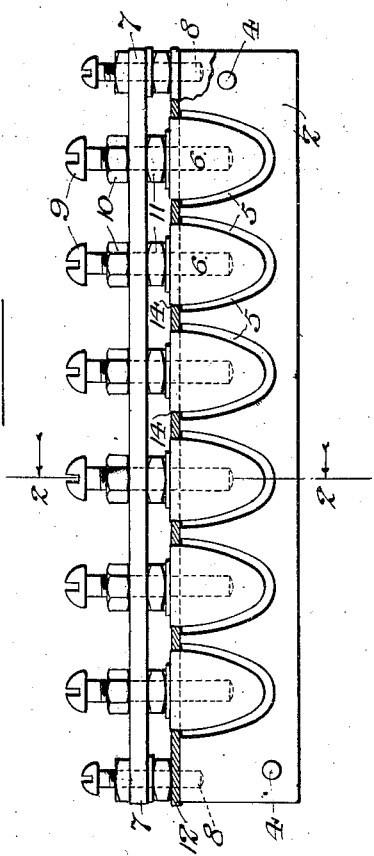
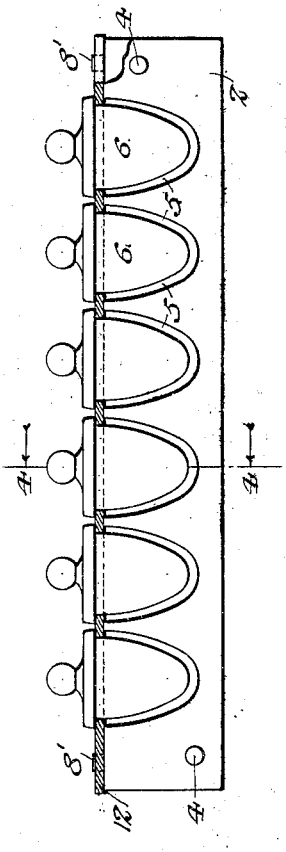

No. 833,102. PATENTED OCT. 9, 1906.
F. J. WINANS.
METHOD OF MAKING CHOCOLATE CREAMS AND THE LIKE.
APPLICATION FILED JAN. 3, 1905.
2 SHEETS—SHEET 2.
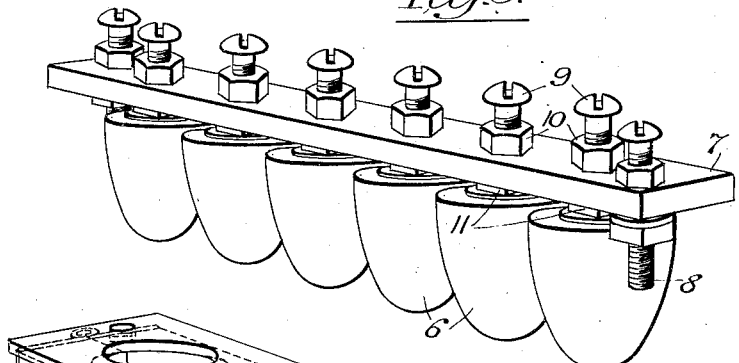
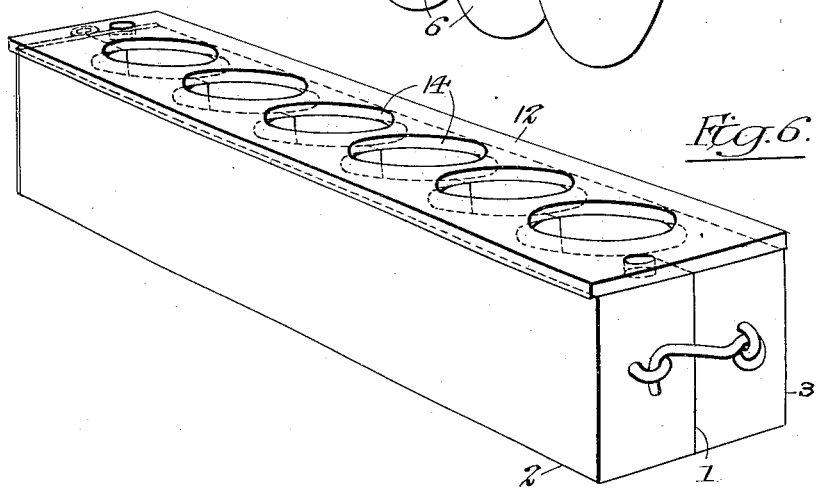
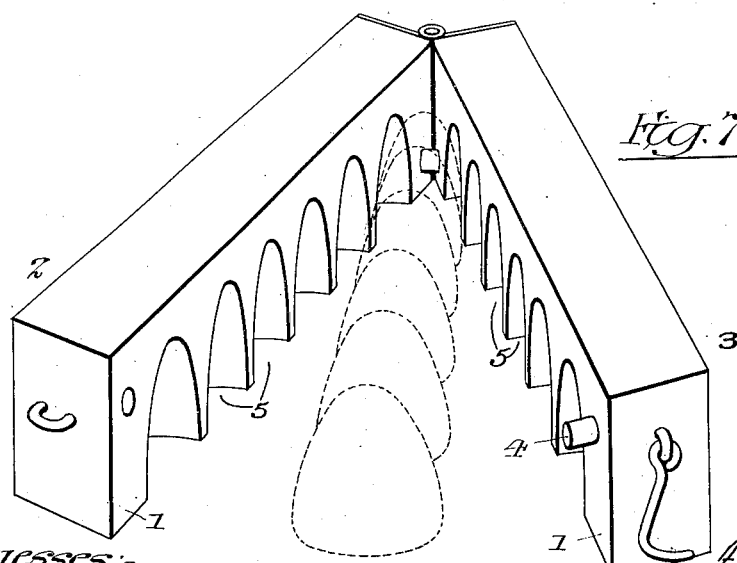
Witnesses:—
Inventor:

UNITED STATES PATENT OFFICE.

FENTON J. WINANS, OF CHICAGO, ILLINOIS.

METHOD OF MAKING CHOCOLATE CREAMS AND THE LIKE.

No. 833,102.　　　Specification of Letters Patent.　　　Patented Oct. 9, 1906.

Application filed January 3, 1905. Serial No. 239,362.

*To all whom it may concern:*

Be it known that I, FENTON J. WINANS, a citizen of the United States of America, residing at Chicago, in the county of Cook and State of Illinois, have invented certain new and useful Improvements in Methods of Making Chocolate Creams and the Like, of which the following is a description.

My invention relates to the production of that class of confections and the like consisting of an outer shell or hull filled with a plastic or fluid body.

The object of my invention is to facilitate the production of articles of this description. To this end my improvement consists in the novel construction, arrangement, and combination of parts herein shown and described, and more particularly pointed out in the claims.

In the accompanying drawings, wherein like or similar reference characters indicate like or corresponding parts, Figure 1 is a side elevation of a mold for producing articles of the class described with substantially one-half of the female part of the mold removed to show the interior arrangement of the device. Fig. 2 is a section taken substantially on line 2 2 of Fig. 1. Fig. 3 is a view similar to that shown in Fig. 1, showing a slightly-modified form of my device. Fig. 4 is a section taken substantially on line 4 4 of of Fig 3. Fig. 5 is a perspective view of the connected forms shown in Fig. 1. Fig. 6 is a perspective view of the mold in position for inserting the forms, and Fig. 7 is a perspective view of the inverted mold in position for discharging the molded objects.

In the preferred form of my device shown in the drawings, 1 is the body portion of a preferably separable mold formed of the two similar parts 2 and 3. Any preferred means may be employed to keep the parts 2 and 3 in accurate registry when in their operating position. As shown, each part is provided with a pin or socket 4 4 near its ends, adapted to engage with a suitable corresponding socket or pin formed upon the opposite half of the mold to perform this function. If preferred, the parts 2 and 3 may be connected at one end by a hinge or equivalent means and at the opposite end by means of a suitable hook or catch, as shown in Figs. 6 and 7. With this arrangement the parts 2 and 3 are securely held in operative relation when desired and may be quickly separated at one end by releasing the catch when it is desired to discharge the molded objects. One or more recesses 5 5 of any desired form are provided in the meeting faces of the parts 2 and 3, each recess being preferably partially formed in each part, as shown, and so formed that when the parts are separated with a molded object in a recess the object may be readily extracted therefrom without becoming marred or disfigured. A form 6 is provided for each recess 5 in the mold 1, each form being preferably provided with suitable means to control its position when placed in operative position within its recess. As shown, a bar 7 is provided common to a plurality of forms 6 and provided with locating means 8 at either end, so that in order to insert the forms in the recesses the locating means 8 must be in operative relation with coöperating parts upon the mold to suitably space the forms from the walls of the recess.

In the preferred form (shown in Figs. 1, 2, and 5) the forms 6 are adjustably attached to the bar 7, so that, if desired, the distance each form enters a recess, and consequently is spaced from the walls of the recess, may be regulated. This is accomplished in the arrangement shown by securing each form upon a screw 9, passing through a suitable opening in the bar 7, and mounting suitable nuts 10 and 11 upon each screw 9 upon opposite sides of the bar 7. It is obvious that by adjusting the position of the nuts upon the screw 9 the position of any of the forms 6 6 may be controlled as desired. Preferably in this arrangement a plate 12 is provided with suitable openings 14 in its face to receive the several forms 6 and may, if desired, cover one entire face of the mold 1, the object of this plate being to hold the forms 6 accurately in position laterally in the recesses 5 to coöperate with the forms 6 to close the mold, and thus smoothly finish the edge of the hull or shell molded therein, and also to hold the hulls firmly in place in the recesses 5 while the forms 6 are being withdrawn and to prevent damage to them at this time by permitting them to stick to the form and to the walls of the recesses at the same time.

In the form shown in Figs. 3 and 4 the bar 7 and coöperating parts are not employed, the forms 6 6 being each independently arranged in the opening 14 in the plate 12, which is provided with suitable means for accurately locating the same in position, consisting in the form shown of suitable pins 8', positioned at either end of the mold and projecting above the face thereof, adapted to engage with suitable openings formed in the plate 12, or, if preferred, the plate 12 may be secured to the mold 1 by suitable screws or equivalent means arranged as preferred.

In operation my mold is placed with the recess 5 opening upward and a suitable quantity of chocolate or other material for forming a hull or shell placed in each recess in a suitably fluid or plastic state. The forms 6 are then placed in position in the recesses, forcing the hull material out of the central part of the recess and up about its sides to the plate 12. The mold is left in this position until the hull material has set or suitably solidified, when the forms 6 and plate 12 are successively removed, and the body or filling material is placed in the cavities of the hulls thus formed, preferably not entirely filling the same, but leaving a space at the top for applying a layer of the plastic or fluid hull material to finish the article and seal the same. As soon as this portion of the hull is sufficiently set or solidified the completed article may be removed in any convenient manner, preferably by inverting the mold 1 and separating the parts 2 and 3, leaving the finished product lying upon its base upon a suitable surface, as shown in Fig. 7.

The above process is particularly adapted to the making of chocolate creams and similar articles where the hull material is structurally weak and the body material difficult to prepare of just the proper consistency. Where the hull is of sufficient strength, it is obvious that, if preferred, the hulls alone may be formed in the mold and at once removed, leaving the body or filling to be inserted and the hull sealed afterward. Usually where articles of this kind, particularly chocolate creams, are made by hand the body or filling above referred to is formed first and then covered with the hull of chocolate by hand. Where this method is employed it is a matter of great importance that the body material be of almost exactly the correct consistency. Even the most expert candy makers find great difficulty in always producing the cream filling of the same physical properties. The margin is very narrow, and in practice it is found that slight variations in ingredients, cooking, or temperature in preparing all affect the product. If too soft, the creams cannot be formed and handled to properly coat them with chocolate. If mixed and produced hard enough to insure the necessary handling, it is liable to result in too hard a product, resulting in a depreciation in selling price of from twenty to forty per cent. The ingredients in each case being substantially the same the depreciation is a sheer loss. Obviously by my method of constructing these articles this difficulty is practically eliminated, as the consistency of the body material may vary greatly without inconvenience or difficulty in manufacture, and consequently the higher-price goods may be produced with substantial certainty.

In the claims where the word "creams" is employed I desire it to be understood as indicating an article composed of a creamy or fluid body incased in a hull or covering composed of a substance substantially similar to chocolate in its consistency and of sufficient strength and hardness to permit of convenient handling possible to that class of goods.

Having thus described my improvement, it is obvious that various immaterial modifications may be made without departing from the spirit of my invention. Hence I do not wish to be understood as limiting myself to the exact form and construction shown.

What I claim as new, and desire to secure by Letters Patent, is—

1. The herein-described process of forming chocolate creams and the like, consisting of first forming cup-like hulls of suitable form of chocolate, and permitting the same to set, then filling said hulls with a suitable body and finally closing the opening to the hull with similar material to the hull.

2. The herein-described process of forming chocolate creams, consisting of first forming a chocolate cup-like hull in a mold, permitting the same to set, then filling the same with a suitable body, and finally closing the opening to the interior of the hull.

3. The herein-described process for making chocolate creams, consisting of, first forming the hull or shell in a suitable metal mold arranged to leave an opening in said hull for introducing the body or filling material, then placing the desired amount of filling material within said hull, and then closing the opening to the interior of said hull with chocolate.

In testimony whereof I have hereunto signed my name in the presence of two subscribing witnesses.

FENTON J. WINANS.

Witnesses:
BURTON U. HILLS,
CHARLES I. COBB.